(12) United States Patent
Oksman et al.

(10) Patent No.: US 10,911,254 B2
(45) Date of Patent: Feb. 2, 2021

(54) HANDSHAKE OPERATION IN POINT-TO-MULTIPOINT ACCESS FROM DISTRIBUTION POINT

(71) Applicant: Intel Corporation, Santa Clara, CA (US)

(72) Inventors: Vladimir Oksman, Morganville, NJ (US); Dietmar Schoppmeier, Unterhaching (DE); Martin Fuss, Munich (DE)

(73) Assignee: MaxLinear, Inc., Carlsbad, CA (US)

( * ) Notice: Subject to any disclaimer, the term of this patent is extended or adjusted under 35 U.S.C. 154(b) by 0 days.

(21) Appl. No.: 16/433,087

(22) Filed: Jun. 6, 2019

(65) Prior Publication Data
US 2019/0386843 A1 Dec. 19, 2019

Related U.S. Application Data

(60) Provisional application No. 62/685,490, filed on Jun. 15, 2018.

(51) Int. Cl.
*H04L 12/28* (2006.01)
*H04L 12/24* (2006.01)
*H04W 84/12* (2009.01)

(52) U.S. Cl.
CPC ...... *H04L 12/2801* (2013.01); *H04L 41/0806* (2013.01); *H04W 84/12* (2013.01)

(58) Field of Classification Search
CPC . H04L 12/2801; H04L 41/0806; H04W 84/12
See application file for complete search history.

(56) References Cited

U.S. PATENT DOCUMENTS

| 9,973,634 | B2* | 5/2018 | Kuipers | H04M 3/007 |
| 10,623,053 | B2* | 4/2020 | Kassel | H04M 3/002 |
| 2012/0147840 | A1* | 6/2012 | Chen | H04L 1/1854 370/329 |
| 2013/0251141 | A1* | 9/2013 | Mermans | H04B 3/32 379/406.06 |
| 2014/0050273 | A1* | 2/2014 | Rao | H04B 3/32 375/257 |

OTHER PUBLICATIONS

Van Bruyssel et al., FDMA scheme enabling mgfast light-weight P2MP (Year: 2017).*
"Series G: Transmission Systems and Media, Digital Systems and Networks, Digital sections and digital line system—Metallic access networks, Handshake procedures for digital subscriber line transceivers." Telecommunication Standardization Sector of ITU. International Telecommunication Union. G.994.1 (Nov. 2018).

(Continued)

*Primary Examiner* — Freshteh N Aghdam
(74) *Attorney, Agent, or Firm* — Maschoff Brennan

(57) ABSTRACT

Techniques discussed herein can facilitate handshake procedures for Point-to-Multipoint (P2MP) communication in connection with various DSL (Direct Subscriber Line) technologies. Various embodiments can employ different methods of separation of signaling to arrange P2MP handshake procedures based on existing Point-to-Point (P2P) handshake procedures. Example embodiments can employ one of separation in frequency, separation in time, or separation in transmission power level.

18 Claims, 12 Drawing Sheets

(56) References Cited

OTHER PUBLICATIONS

Van Bruyssel, Danny et al; "G.mgfast: FDMA Scheme Enabling mgfast lightweight P2MP;C22"; International Telecommunication Union, vol. 4/15; Nov. 21, 2017.
Kuipers, Martin; "G.mgfast: Handshake and Initial Phase of Initialization Process; C10"; International Telecommunication Union; vol. 4/15; Apr. 17, 2018.
International Search Report and Written Opinion dated Aug. 30, 2018 in connection with International Application PCT/US2019/063008.

* cited by examiner

HANDSHAKE OPERATION IN POINT-TO-MULTIPOINT ACCESS FROM DISTRIBUTION POINT

REFERENCE TO RELATED APPLICATIONS

This application claims the benefit of U.S. Provisional Patent Application No. 62/685,490 filed Jun. 15, 2018, entitled "HANDSHAKE OPERATION IN POINT-TO-MULTIPOINT ACCESS FROM DISTRIBUTION POINT", the contents of which are herein incorporated by reference in their entirety.

FIELD

The present disclosure relates to wireline technology such as G.mgfast or similar, and more specifically to handshake operation in point-to-multipoint access scenarios.

BACKGROUND

Modern wired access systems can bring a huge bandwidth to premises. To distribute this bandwidth inside the premises, WiFi is currently the main and the most popular network providing bandwidth distribution within premises. Unfortunately, WiFi connectivity and transport capability depends on the type of premise: in big premises or premises with concrete or brick internal walls, the capacity of WiFi channels is substantially reduced and service delivery with high quality of service (QoS) may become problematic.

WiFi operation can be improved by using multiple WiFi access points (APs) connected to the residential gateway by wired lines. This connection is a popular application for wired home networking system, such as HomePlug, MoCA, or G.hn. However, in the case of wide-bandwidth access systems operating over phone wires, efficient use of wireline home networking systems is often not possible because of mutual interference between the in-home system operating over phone line or power line and access system, also using phone line. That's because a typical residence in many regions has only two media types: phone wiring and power line, which may have rather substantial mutual crosstalk. This crosstalk can be mitigated at low frequencies, as defined in ITU-T G.9977, but this may not work efficiently for systems with a wider transmission spectrum, such as G.fast and MGFAST. Additionally, the capacity of power lines can sometimes be low, such that connection to some points is not possible.

Another possibility is to connect the WiFi AP directly to the access system. This method is currently proposed for modern access systems, such as MGFAST: a modem at the distribution point unit (DPU) may be connected to multiple CPEs (Customer Premises Equipments) in the premises, forming point-to-multipoint connection (P2MP). Each CPE, in turn, can be equipped with a WiFi AP.

Another feature in DSL, G.fast, and also MGFAST is support of multi-mode operation. DSL modems have many generations (ADSL, VDSL, G.fast, MGFAST), many different features (plain, vectored, using INP), and different performance capabilities defined in profiles, and there is no guarantee that modems at the DPU/CO (Central Office) side and customer side will have the same list of capabilities, or even be of the same type. Therefore, before the pair of modems at the two sides of the line begins communication, they can share their mutual capabilities and start communication in a mode of operation that both modems can support. However, existing handshake techniques (e.g., defined in ITU-T G.994.1) cannot be employed for P2MP operation and fail to address multi-mode scenarios where P2MP operation is supported by the DPU/CO or at least one CPE.

DETAILED DESCRIPTION

Figure 1:
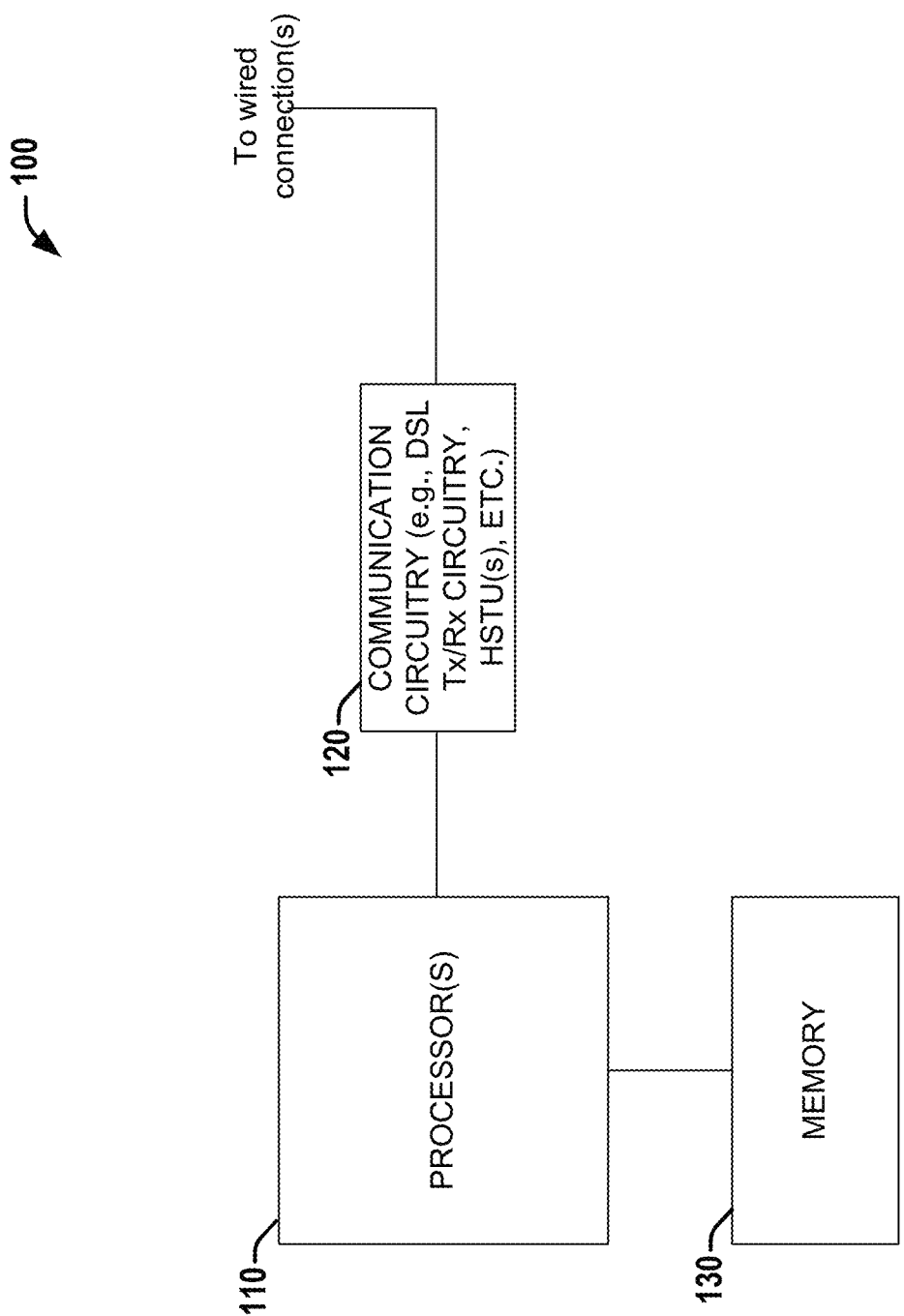
FIG. 1 is a block diagram illustrating an example DSL (Direct Subscriber Line) technology-enabled modem useable in connection with various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein can-be implemented into a system using any suitably configured hardware and/or software.

At a startup of a particular line, to exchange modems capabilities and derive a common mode of operation, all current DSL technologies (including ADSL, VDSL, G.fast, and others) use a handshake procedure defined in ITU-T Recommendation G.994.1. This procedure, before modems initialize, establishes off-band communication between CPE and CO/DPU modems on a pre-defined small set of tones (2 or 3 tones per direction). Using this communication, modems exchange their capabilities, available modes of operation, and other negotiable features, and select a common mode of operation. Further, modems initialize in the selected mode and establish data communication as they reach showtime. The G.994.1 procedure is extremely simple and robust, so it works properly over almost unknown channels with high attenuation and tough noise conditions.

Since G.994.1 is a Recommendation used in all kinds of DSL, new DSL systems, such as MGFAST, should be capable also to use it, because otherwise the device operating MGFAST is not a multimode device that can implement backwards compatibility with previous DSL standards.

However, one issue with the current handshake protocol G.994.1 is that it is defined to work only in P2P (Point-to-Point) mode, wherein one CPE modem performs handshake procedure with one CO/DPU modem. However, in MGFAST there is a desire to connect multiple CPEs modems to one CO/DPU modem. Thus, the existing G.994.1 protocol cannot be used in this scenario.

There are existing methods to connect multiple modems to each other in home networking (e.g., WiFi, G.hn, or HomePlug). In the case of WiFi, multiple end-units connect to the same access point (AP). These connections are usually performed using collision avoidance techniques that include synchronization of all end-units from the AP, or operation with collisions. These operations are based on the assumption that the AP and end-units use the same network admission protocol and have a known mode of operation. However, this is not the case for G.994.1, because initially both ends do not know what DSL technology operates at the other end. Given this condition, these existing networking protocols cannot be applied.

Various embodiments discussed herein can address scenarios wherein both the CO/DPU and the CPE modem can be of any DSL (Digital Subscriber Line) technology (e.g., ADSL (Asymmetric DSL), VDSL (Very-high-bit-rate DSL), G.fast, MGFAST, etc.), and possibly either or both is a multi-mode device implementing more than one DSL technology.

According to various embodiments discussed herein, if a P2MP (Point-to-MultiPoint) scenario is set up at a customer premises, the P2MP CPEs can employ special signals/flags prior to running the standard G.994.1 protocol to get permission starting up G.994.1. Based on handling of these signals/flags, the CPEs can initialize one after another (e.g., sequentially).

A regular (P2P (Point-to-Point) CO/DPU modem ignores these special signals/flags and can continue its normal operation after the first CPE gets connected. A CO/DPU modem that does support P2MP, after the first CPE gets connected, can set up its P2MP configuration and can assist other CPE(s) to get admitted to the network.

Various embodiments can provide advantages over existing techniques. One such advantage is that embodiments discussed herein can efficiently facilitate P2MP operation without changes to the existing G.994.1 standard protocol, by adding handshake functionality to the CPE(s) modem(s) that are capable of supporting P2MP, but which is transparent for the CO/DPU modem(s) and not requiring any P2MP functionality to be pre-configured in the CO/DPU modem(s).

In various aspects, embodiments discussed herein can facilitate handshake operations for one or more DSL technologies in connection with a P2MP mode. Various embodiments can employ signaling that can facilitate handshakes in connection with the P2MP mode, which can vary based on the embodiment. Some embodiments can employ signaling based on separation in frequency. Other embodiments can employ signaling based on separation in time. Further embodiments can employ signaling based on separation in transmit power level.

Referring to FIG. 1, illustrated is an example block diagram of a system 100 employable at a CPE (Customer Premises Equipment) or CO (Central Office)/DPU (Distribution Point Unit) that facilitates handshake operations for P2MP (Point-to-MultiPoint) access, according to various aspects described herein. System 100 can include one or more processors 110 comprising processing circuitry and associated interface(s), communication circuitry 220 (e.g., comprising DSL (Direct Subscriber Line) transmit and receive (e.g., transceiver) circuitry, which can comprise at least one HSTU (HandShake Transceiver Unit), e.g., HSTU-C(s) or HSTU-R, etc), and a memory 130 (which can comprise any of a variety of storage mediums and can store instructions and/or data associated with one or more of processor(s) 110 or communication circuitry 220). In various aspects, system 100 can be included within a CPE or CO/DPU, depending on the embodiment. As described in greater detail below, system 100 can facilitate one or more aspects discussed below in connection with handshake operation(s) for P2MP access in connection with one or more DSL technologies (e.g., MG FAST).

Figure 2:
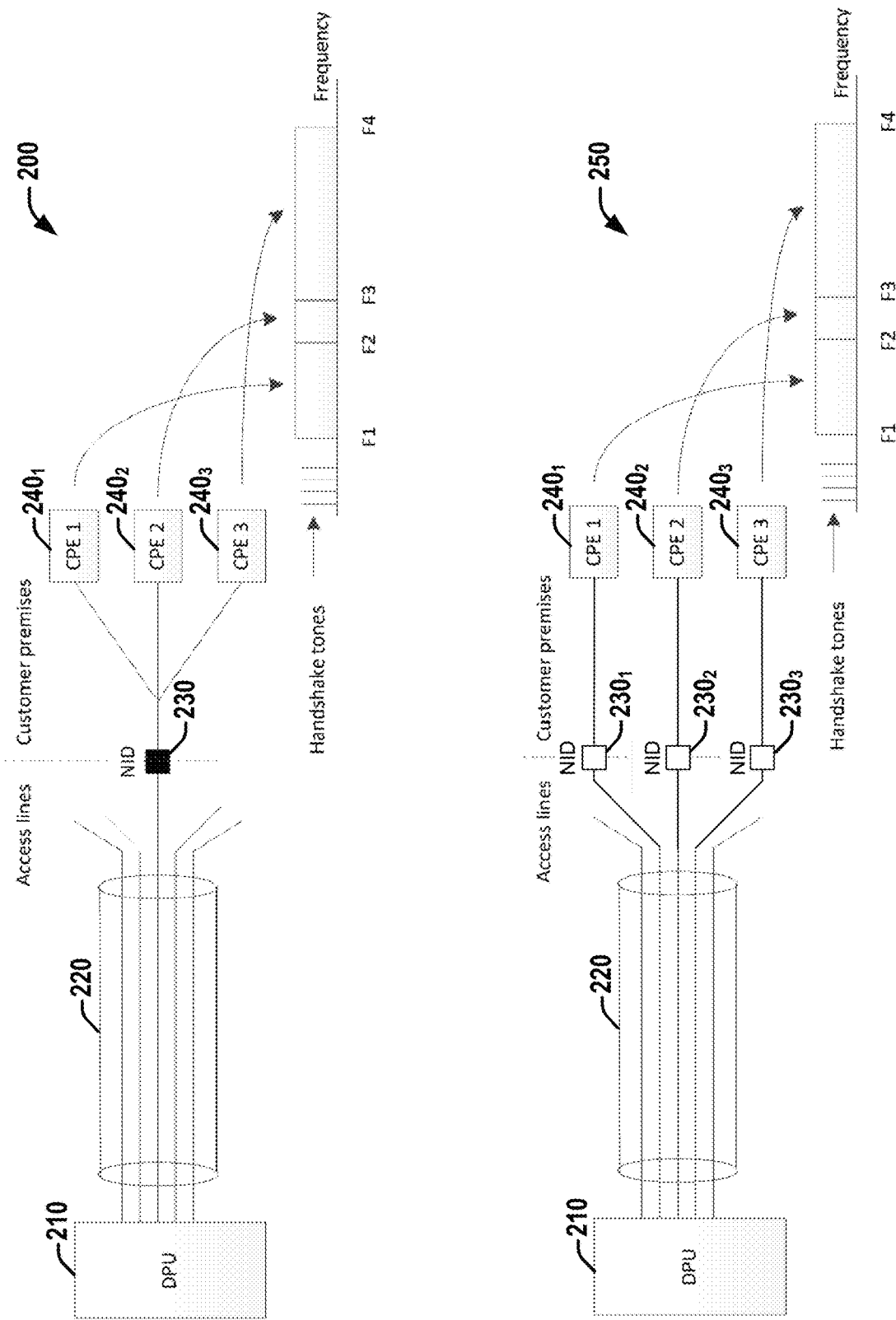
FIG. 2 is a diagram illustrating two example deployment scenario showing example techniques for connecting one or more CPEs (Customer Premises Equipment(s)) employing a P2MP (Point-to-MultiPoint) mode to a DPU (Distribution Point Unit) modem, according to various embodiments discussed herein.

Referring to FIG. 2, illustrated is a diagram of two example deployment scenarios showing example techniques for connecting one or more CPEs (Customer Premises Equipment(s)) $240_i$ employing a P2MP (Point-to-MultiPoint) mode to a DPU (Distribution Point Unit) modem 210, according to various embodiments discussed herein. In deployment scenario 200, the access line 220 coming from the DPU 210 can split at the customer premises, and can be connected (via NID (Network Interface Device) 230) to a number of CPEs $240_i$ located within a customer premises (three are shown in FIG. 2, although other numbers can be employed in various scenarios). In scenario 250, the DPU 210 can alternatively feed a number of premises via separate wire pairs connected to the same DPU, each premise connected via its NID $230_i$.

The bandwidth used for data communication can be between F1 and F4, as shown in FIG. 2. The P2MP data transmission technique shown in FIG. 2 employs frequency division multiple access (FDMA), such that each of the CPEs $240_i$ can employ a particular set of frequencies. The frequency sets for each of the CPEs $240_i$ using FDMA are non-overlapping, and for simplicity these frequency sets are shown in FIG. 2 as three continuous parts of the frequency spectrum. Additionally, in various embodiments, other types of multiple access, such as time-division multiple access (TDMA) can be employed to establish P2MP.

The G.994.1 handshake procedure uses separate frequencies, handshake tones, that are off-band and shown in FIG. 2 to the left of frequency F1. For embodiments employing the first set of aspects (e.g., frequency-based techniques), CPEs use different sets of HS tones, while for embodiments employing the second set of aspects and the third set of aspects, the same HS frequency sets can be employed by each CPE, while separated in time or different in transmit power, respectively.

The handshake protocol in case of P2MP should be able to operate when data is transmitted, because one CPE (e.g., any of $240_i$, etc.) can join to the network when others are in showtime. The frequencies used for handshake are predefined, because otherwise modems can be unable to detect each other (G.994.1 employs predefined upstream and downstream tone sets). Since the bandwidth used by a particular CPE is not known beforehand, distortions of data due to handshake can be avoided via assigning for handshake frequencies that are out of band for data transmission. In FIG. 2, these frequencies are shown below the data frequency spectrum, but any other allocation not overlapping with the data spectrum (e.g., above the frequency spectrum) is also possible. In some embodiments, handshake tones associated with a CPE can be within the data spectrum, and can be selected such that they do not overlap with data transmission subcarriers of other CPEs associated with the line.

The ITU-T G.994.1 procedure uses sets of two or three subcarriers in the upstream and another set of 2 or three subcarriers in the downstream to establish communication between G.994.1 units, called Handshake Transceiver Unit (HSTU) at the CO/DPU (HSTU-C) and at the residence (HSTU-R). The HSTU is embedded in the corresponding DPU port or CPE port, respectively, to implement handshaking protocol. After handshaking protocol is complete, both HSTUs are idle till the next initialization of the line (after a loss of synchronization between DSL modems, or reset of the CPE, or power-out, etc.).

According to G.994.1, a handshake procedure can be initiated from the HSTU-C(HSTU-C initiated startup) or from the HSTU-R (HSTU-R initiated startup). The majority of applications use HSTU-R initiated procedure because the service model used by operators assumes the customer (HSTU-R side) request the service from the CO/DPU when required, but not vice versa. The standard HSTU-R-initiated G.994.1 procedure comprises two parts: (1) tones exchange: for detection of handshake and mutual synchronization of HSTU-C and HSTU-R; no information can be conveyed in either transmission direction during tone exchange and (2) message exchange (transaction state)—for message exchange between HSTUs; in messages, the HSTUs can indicate to each other the data transmission capabilities and features of associated DSL modems at the CO/DPU and the CPE, based on which one of the sides (usually, CO/DPU) makes a decision of which mode of operation and features to use for data communication.

Both parts of the HSTU-R initiated G.994.1 procedure use carrier sets in upstream and downstream assigned for the particular DSL technology; if a CO or a CPE modem is able to implement more than one DSL technology, its HSTU transmits and receives all relevant handshake tone sets.

Figure 3:
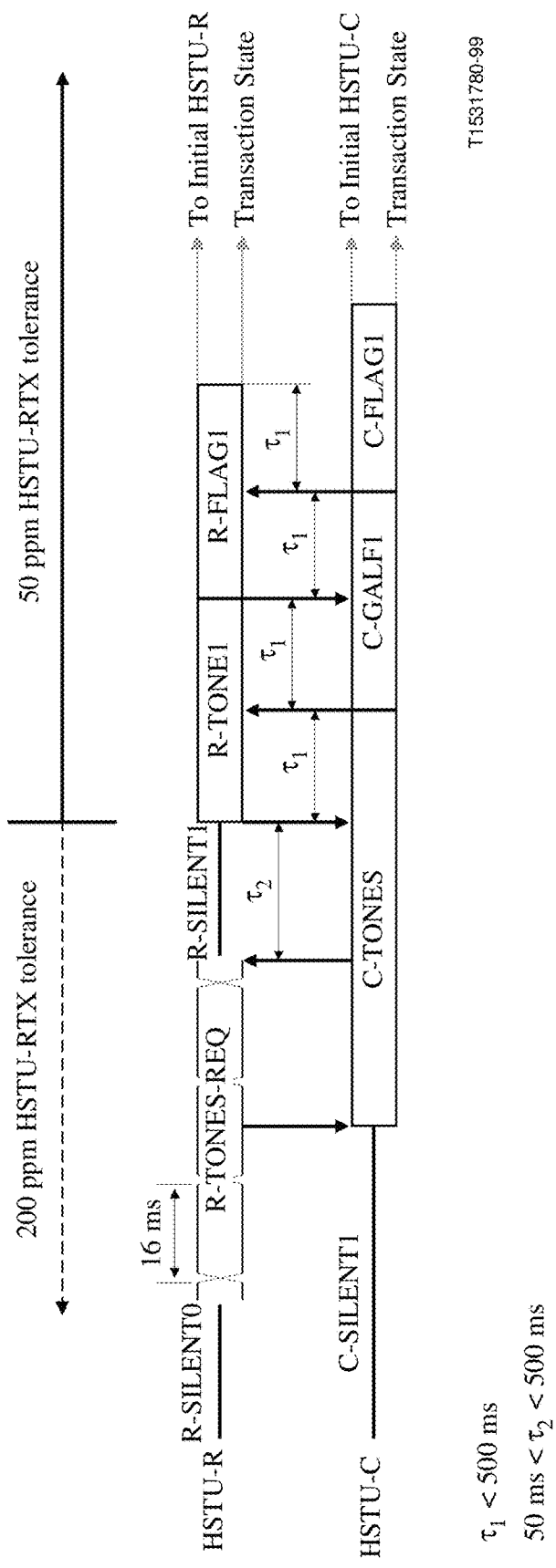
FIG. 3 is a diagram illustrating the tones exchange part of Handshake Transceiver Unit (Residence) (HSTU-R) initiated startup as described in ITU-T G.994.1 clause 11.1.1, in connection with various aspects discussed herein.

Referring to FIG. 3, illustrated is a diagram showing the tones exchange part of HSTU-R initiated startup as described in G.994.1 clause 11.1.1 (HSTU-R initiated start-up procedure, FIG. 14/G.994.1), in connection with various aspects discussed herein.

The G.994.1 HSTU-R initiated start-up procedure (illustrated in FIG. 3) can operate as follows: (1) The HSTU-R, after CPE is turned on, starts sending R-TONES-REQ signal; the R-TONES-REQ uses handshake tones from the standard upstream tone set(s) and applies phase reversal every 16 ms; (2) The HSTU-C detects the R-TONES-REQ signal and answers with C-TONES signal; C-TONES signal uses handshake tones from the standard downstream tone set(s), no phase reversal applied; (3) As HSTU-R detects C-TONES, it stays quiet during 50-500 ms (R-SILENT1), after which HSTU-R sends R-TONE1, which is a plain tone with no phase reversal, like a C-TONES; (4) After detection of R-TONE1, the HSTU-O sends C-GALF1, a modulated signal, which is an inverted idle flag; (5) As the HSTU-R detects the C-GALF1 flag, it transmits R-FLAG1, a modulated signal that is an idle flag (inverted C-GALF1); (6) After detection of the R-FLAG1, the HSTU-O transmits C-FLAG1, a modulated signal that is an idle flag, the same as R-FLAG1; and (7) As the HSTU-R receives the C-FLAG1, it starts the message exchange part by transmission of the CLR message; after sending the CLR message, HSTUs continue a message exchange that results in DSL modem mode select and initialization of the line.

The description of the G.994.1 HSTU-R initiated start-up procedure above shows that in scenarios involving multiple HSTU-Rs connected to the same HSTU-C, the tone exchange will break, for instance, if multiple HSTU-Rs send R-FLAG1s at slightly different times, the HSTU-C may not be able to detect them. Thus, the standard G.994.1 protocol is not able to operate in P2MP scenarios. Since modems still need to use the described G.994.1 procedure to be compatible with other DSL technologies (to support multi-mode operation), in various embodiments discussed herein, G.994.1 can be preempted with an additional arrangement, which can allow CPEs to perform handshake without mutual disturbance. Various embodiments can avoid disturbance of existing techniques by one of: (1) separation in frequency; (2) separation in time; or (3) separation in power.

Use of G.994.1 by Separating HSTU-Rs in Frequency:

Various embodiments can employ a first set of techniques, involving separation in frequency. Separation in frequency is the most straightforward of the three techniques from the protocol perspective: one HSTU-C peer can be established at the CO/DPU side per each HSTU-R at customer premises (e.g., per each CPE), and each HSTU-C can operate with its peer HSTU-R over a dedicated carrier set, with one set in the upstream and one set in the downstream. Thus, for multiple CPEs connected at the customer premises, there can be multiple G.994.1 procedures running at the same time, each on a different set of HS carriers.

As one example, assume that there are 4 HSTU-Rs at the customer premises operating in a P2MP mode, and each HSTU-R (at the associated CPE) is configured (e.g., by the user, randomly selected, etc.) with a number K, e.g., K=0, 1, 2, or 3 that is associated with an individual upstream and downstream HS carrier set. An example of carrier sets that can be employed is presented in Table 1, below. Additionally, although in Table 1 and other example discussed herein, 4 possible values are given for K as an example embodiment; however, in other embodiments, other numbers of CPEs (e.g., 2, 3, greater than 4, etc.) can be simultaneously employed for P2MP in various embodiments.

One of the HSTU-Rs (e.g., of the head-CPE, e.g., the HSTU-R associated with K=0, etc.) can be assigned a standard P2P carrier set (e.g., A43 set, as shown in Table 1, but can be also another one defined in G.994.1, e.g., B43 set), while other HSTU-Rs (K=1, 2, 3) use special P2MP carrier sets, which can employ carrier frequencies that are not overlapped with standard (P2P) carrier sets. This allows for separation of P2P (legacy) handshake from P2MP.

TABLE 1

Example carrier sets for P2MP (MGFAST over POTS)

| CPE # | Carrier set type | US carrier set | DS carrier set |
|---|---|---|---|
| CPE 1 (K = 0) | MGFAST (P2P) | 9, 17, 25 (A43) | 40, 56, 64 (A43) |
| CPE 2 (K = 1) | P2MP | 7, 12 | 72, 88 |
| CPE 3 (K = 2) | P2MP | 14, 37 | 96, 257 |
| CPE 4 (K = 3) | P2MP | 45, 53 | 293, 337 |

In one embodiment, initially, only one HSTU-C is activated at the CO/DPU (e.g., DPU 210, etc.) so that the CO/DPU expects a regular (P2P) G.994.1 HSTU-R initiated procedure, as discussed above, which does not employ P2MP carrier sets (e.g., those for K=1, 2, and 3 in Table 1). Thus, the HSTU-R configured with K=0 (which is usually the Residential Gateway (RGW), can also be called Head-CPE) starts a normal G.994.1 procedure. During this procedure, this HSTU-R indicates a request for P2MP support to the HSTU-C during the message exchange part. If the CO/DPU unit is able to support P2MP and the P2MP mode gets selected, the additional HSTU-Cs can start monitoring for HSTU-R initiated G.994.1 over P2MP carrier sets shown in Table 1, and start standard G.994.1 procedures with their peer HSTU-Rs.

In another embodiment, e.g., in a deployment scenario for multi-subscriber configuration (MSC), different CPEs connected to the same line can reside at different residences (and serve different users). In such a scenario, the HSTU-C can be pre-configured for P2MP support by the operator: all HSTU-Cs can be activated, so the P2MP carrier sets can be used right after the power up (since with this deployment no multimode option is possible on both ends). As a part of this pre-configuration, the CPEs can be assigned (e.g., by the user, operator, randomly, etc.) appropriate numbers (e.g., K=0, 1, 2, or 3, in the example embodiment).

For embodiments employing the first set of aspects, with separation by frequency, the standard G.994.1 protocol can serve for P2MP; all HSTU-Rs can be activated and run simultaneously, which can speed up the initialization procedure overall.

However, as described above, P2MP involves the following specifics: (1) The number of HSTU-Cs is generally no longer one, but equal to the number of P2MP CPEs and (2) More egress into non-FAST/MGFAST lines in the same binder and thus more bandwidth loss due to additional carrier sets.

Concerning these specifics, the following improvements can be employed in various embodiments: (1) Only a single HSTU-C operates at the CO/DPU, running all HSTU-Rs sequentially by switching from one P2MP carrier set to another; while the HSTU-C operates with one HSTU-R, others can wait using the usual mechanism of G.994.1 (e.g., quit the procedure due to no response and re-start again) and (2) The number of carrier sets and the number of HSTU-Cs can be reduced if lines with K>0 use a single P2MP carrier set and are separated by time, as discussed below, in connection with the second set of aspects (in such scenarios, the RGW can have a permanent HS channel, while other CPEs share the second channel).

Use of G.994.1 by Separating HSTU-Rs in Time:

With the second set of techniques, HSTU-Rs in P2MP mode start sequentially, one after another, after detecting that the medium is free.

To prepare for P2MP operation, similarly to the first set of aspects (separation in frequency), each HSTU-R can be configured to P2MP mode by assigning (e.g., via operator, user, randomly, etc.) it a number K (e.g., K=0, 1, 2, or 3, if up to 4 CPEs are allowed in P2MP mode, or another set of values if a different number of CPEs are allowed). Value K=0 can be assigned to a RGW (also referred to as head-CPE), while HSTU-Rs of additional CPEs can be assigned other values (e.g., K=1, 2, or 3).

In various embodiments employing the second set of aspects, one of two main techniques of separation in time can be employed: (1) a first technique, a self-controlled separation can be employed, wherein each HSTU-R detects presence of other HSTU-Rs independently and asynchronously or (2) a second technique, a centrally-controlled separation, wherein either HSTU-C or one of the HSTU-Rs (e.g., RGW) controls the schedule of initialization for other/additional HSTU-Rs. The second technique is also required in embodiments addressing the case when different HSTU-Rs can't detect the presence of each other (e.g., their connections to the single HSTU-C are electrically separated by the specially designed analog front end).

Technique 1—P2MP Initialization Control Using Handshake Identification Flag

According to a first technique of the second set of aspects, embodiments can perform P2MP initialization that can be controlled using a Handshake Identification Flag.

In embodiments employing this first technique, all HSTU-Rs configured as P2MP can perform the following additional acts before starting the standard G.994.1 HSTU-R-initiated start-up procedure (discussed in clause 11.1.1 of G.994.1, and shown in FIG. 3 herein).

(1) Each HSTU-R in P2MP mode can stay quiet and can check the medium for G.994.1 activity—if it detects an on-going G.994.1 procedure, for example, via transmission from another HSTU-R or from HSTU-C, it keeps staying quiet.

(2) If the medium is detected quiet, the HSTU-R continues checking the medium for a predetermined time period $T_Q$ (e.g., seconds, milliseconds, etc.); if no G.994.1 activity is detected during the period $T_Q$, the HSTU-R can transmit a Handshake Identification Flag (HI-FLAG) that is intended to facilitate collision control. If during the HI-FLAG, the HSTU-R detects no other G.994.1 activity, the HSTU-R can start the regular G.994.1 procedure (by sending R-SILENT0 followed by R-TONES-REQ, as shown in FIG. 3). Otherwise, if the HSTU-R detects other G.994.1 activity during HI-FLAG, the HSTU-R stays quiet for a time $T_{Q1}$ (K) (e.g., seconds, milliseconds, etc.) and can then restart the procedure, by returning to (1) and resuming checking the medium until the HSTU-R detects no G.994.1 activity again.

Figure 4:
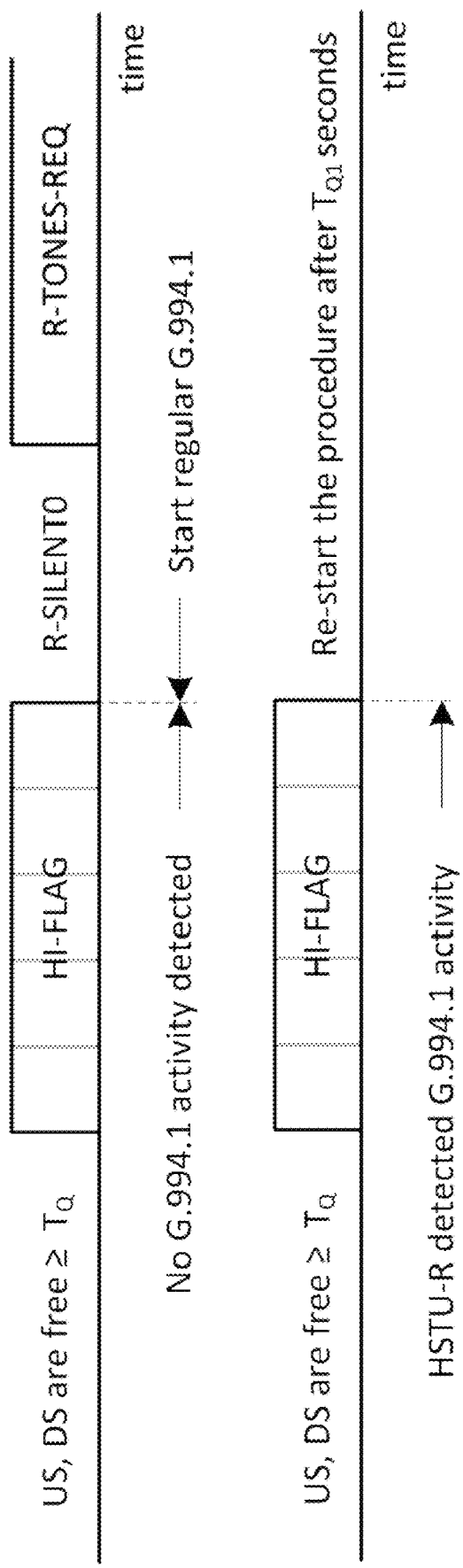
FIG. 4 is an example timing diagram illustrating a collision detection and avoidance procedure involving a handshake identification flag, according to various embodiments discussed herein.

Referring to FIG. 4, illustrated is an example timing diagram showing a collision detection and avoidance procedure involving a HI-FLAG, according to various embodiments discussed herein. Note that for the first technique of the second set of aspects, the R-SILENT0 time has to be limited. Currently, G.994.1 defines R-SILENT0 to be at least 500 ms and the upper limit is not defined. For P2MP support according to this first technique, the upper limit for R-SILENT0 time should be less than the time $T_Q$.

The HI-FLAG is structured so that an HSTU-R, while sending HI-FLAG, can also detect whether other HSTU-R(s) are also transmitting HI-FLAG or other G.994.1 activity is present. If HSTU-R can transmit and receive simultaneously, the HI-FLAG can be just an active transmission, like R-TONES-REQ or R-TONE1. However, if the HSTU-R cannot simultaneously transmit and receive (which is expected to be the usual implementation case in current G.994.1), one solution that can be employed in various embodiments is to shape the HI-FLAG transmitted by each HSTU-R as a unique pattern that includes periods of transmission and silence; if these patterns generated by different HSTU-Rs are selected appropriately, there will be always a silence slot in one pattern during which the HSTU-R receiver can detect a transmission slot in another pattern. Thus, any HSTU-R can discover whether, during the time it sends the HI-FLAG, there is another HI-FLAG, sent by some other HSTU-R, or other G.994.1 activity (which is possible, but not expected) is on the line.

Depending on the pattern, in some embodiments (employing a priority-based pattern), HI-FLAGs can be detected by all transmitting HSTU-R, except one. In other embodiments (employing a "no-priority" pattern), HI-FLAGs can be mutually detected by all transmitting HSTU-Rs. Other embodiments employing other patterns are also possible.

Figure 5:
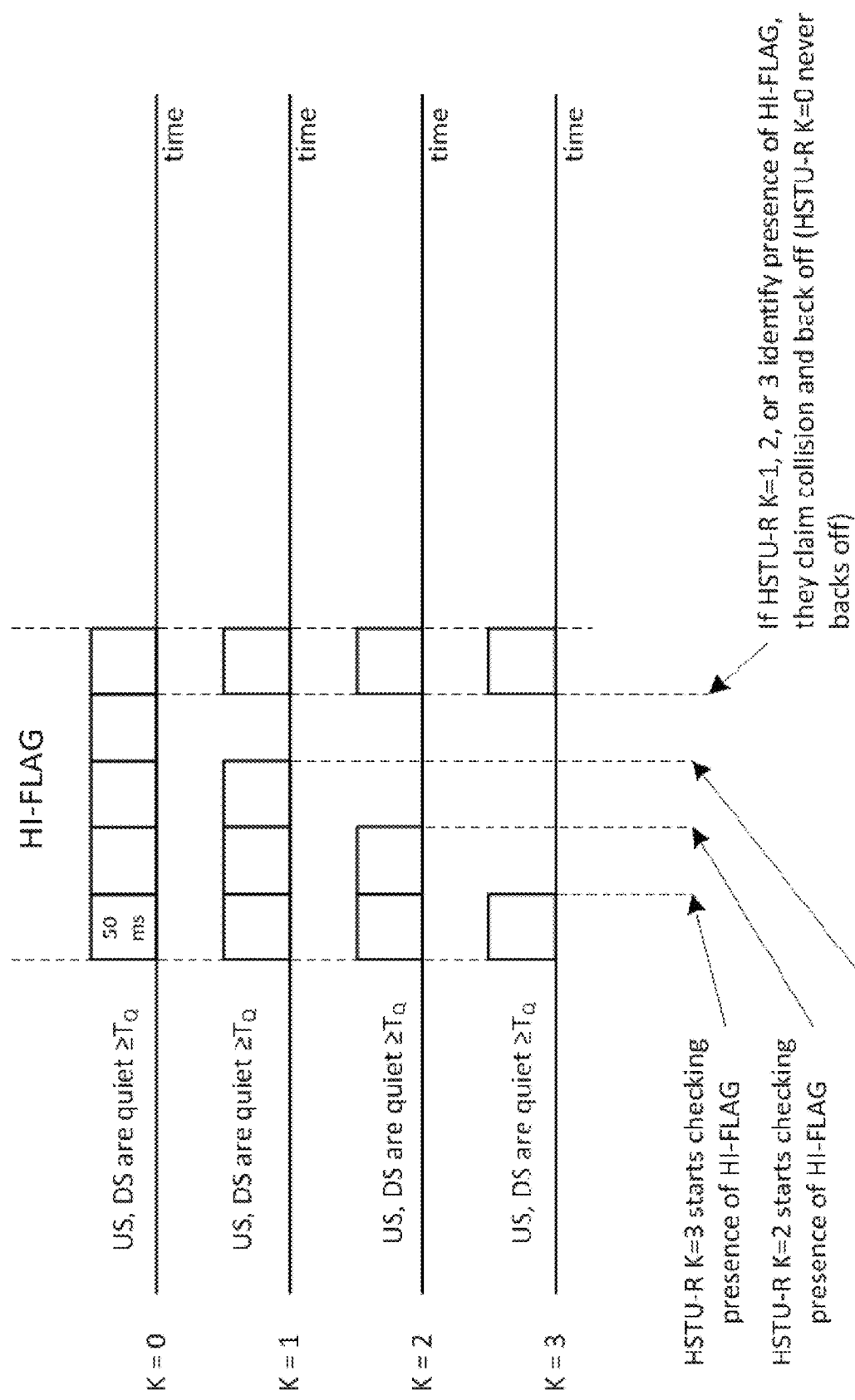
FIG. 5 is a diagram illustrating a first set of example priority-based HI-FLAG (Handshake Identification Flag) patterns for a scenario involving a maximum of four CPEs, according to various embodiments discussed herein.

Priority-Based Pattern:

In embodiments employing a priority-based pattern, the HSTU-R that doesn't detect HI-FLAGs sent by other HSTU-Rs can proceed straight to regular G.994.1, while all other HSTU-Rs can stay quiet and re-start after a time Tai (e.g., seconds, milliseconds, etc.). Referring to FIG. 5, illustrated is a diagram showing a first set of example priority-based HI-FLAG patterns for a scenario involving a maximum of four CPEs, according to various embodiments discussed herein. The example patterns of FIG. 5 comprise 5 time slots, 50 ms each; with a total duration of HI-FLAG of 250 ms. The HI-FLAG pattern associated with the HSTU-R can depend on the assigned value of K (e.g., among a set of available patterns, wherein the set of available patterns can depend on a maximum value for K), which can indicate the priority of the HSTU-R for start-up. The example timing diagram of FIG. 5 is for the case of 4 HSTUR-s; in the example HI-FLAG patterns shown, the HSTU-R with K=0 (of the RGW or head-CPE) has the highest priority and the HSTU-R with K=3 has the lowest priority.

Each HSTU-R can transmit the first 4-K active time slots of its pattern (for embodiments wherein the maximum number of values of K=0, . . . , (N−1) is N=4; in general, the first N-K active time slots of its pattern) and then can starts monitoring presence of other HI-FLAG patterns. If a HI-FLAG pattern is detected by that HSTU-R after the first 4 (or N) slots, the HSTU-R can stay quiet after completion of the HI-FLAG for a time $T_{Q1}$ (e.g., seconds, milliseconds, etc.), and can then restart. If not, the HSTU-R can proceed to a regular G.994.1 procedure.

FIG. 5 shows that if two HSTU-Rs send HI-FLAGs at the same time, the HSTU-R with higher priority (smaller value of K) always wins (e.g., proceeds to G.994.1 handshake prior to other HSTU-Rs), and that the HSTU-R with K=0 (e.g., of the RGW/head-CPE) wins against all other HSTU-Rs.

Note that FIG. 5 shows all 4 HI-FLAGs transmitted at the same time, because simultaneously initiating transmission is the only scenario in which more than one HSTU-R can be transmitting their respective HI-FLAGs at a given time. If two HSTU-Rs would start transmission of their HI-FLAGs with a noticeable time shift, one of them (the one that would otherwise start later) can detect activity on the line right after the other one starts and can therefore stay quiet.

Figure 6:
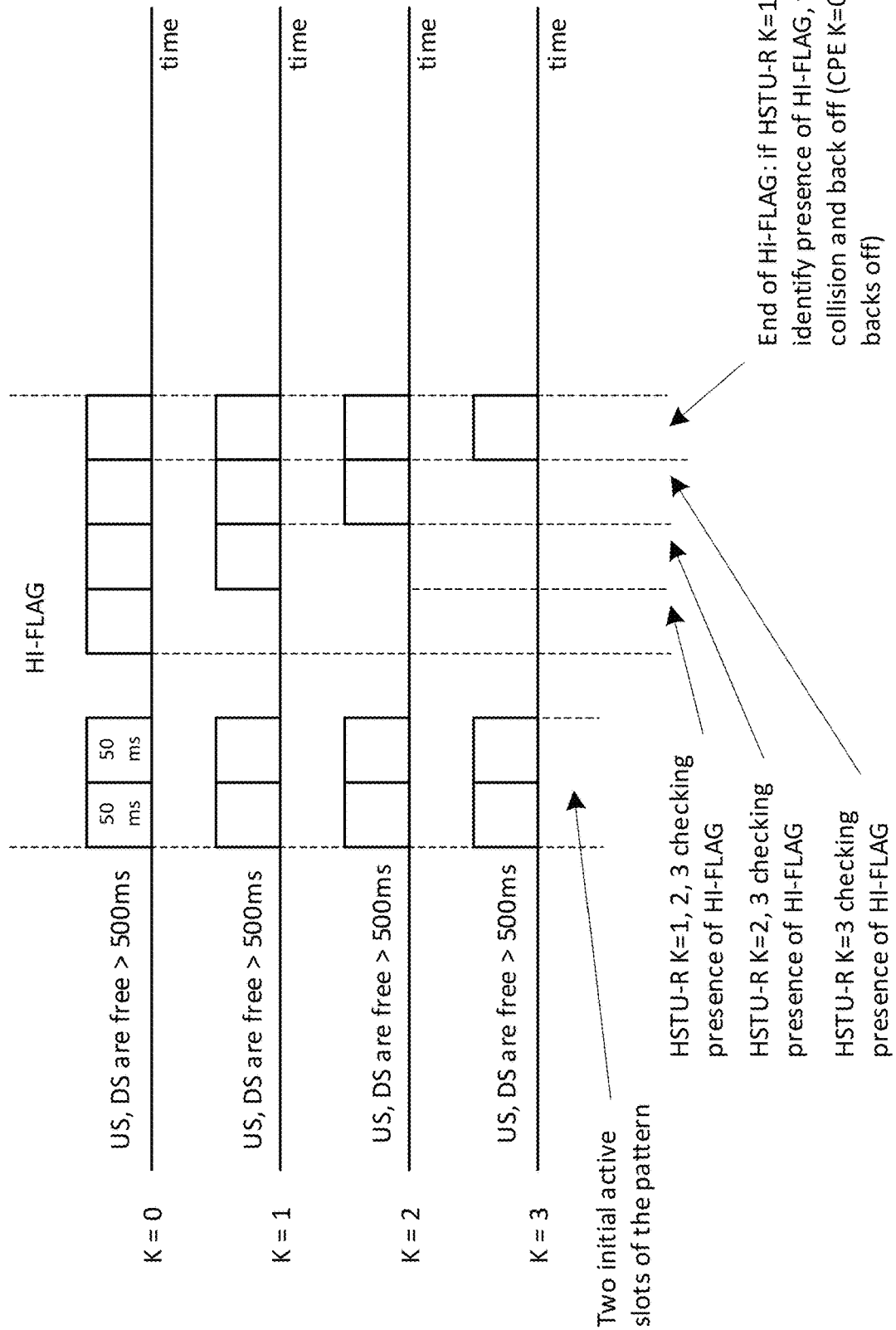
FIG. 6 is a diagram illustrating a second set of example priority-based HI-FLAG (Handshake Identification Flag) patterns for a scenario involving a maximum of four CPEs, according to various embodiments discussed herein.

Referring to FIG. 6, illustrated is a diagram showing a second set of example priority-based HI-FLAG patterns for a scenario involving a maximum of four CPEs, according to various embodiments discussed herein. FIG. 6 shows another type of priority pattern is which the first active slots(s) are used for indication of the start of the pattern to the HSTU-C, followed by a number of silence slots, which is unique for each HSTU-R, followed by a number of active slots, which fill the rest of the pattern (the pattern has a fixed length). With this pattern the HSTU-R with the smaller number of slots always has priority over HSTU-Rs with bigger number of slots.

No Priority Pattern:

In embodiments employing a no priority HI-FLAG pattern, all HSTU-Rs that start at the same time mutually detect the presence of other HI-FLAGs and, in response to detecting one or more other HI-FLAGs, stay quiet for a time $T_{Qi}$ (K) (e.g., seconds, milliseconds, etc.), and then re-start. In various embodiments, the value Tai can depend on K (e.g., $T_{Qi}=K\times0.5$ seconds, or other function of K), or can be picked randomly, so the HSTU-Rs are unlikely to transmit their HI-FLAGS at the same time again.

Figure 7:
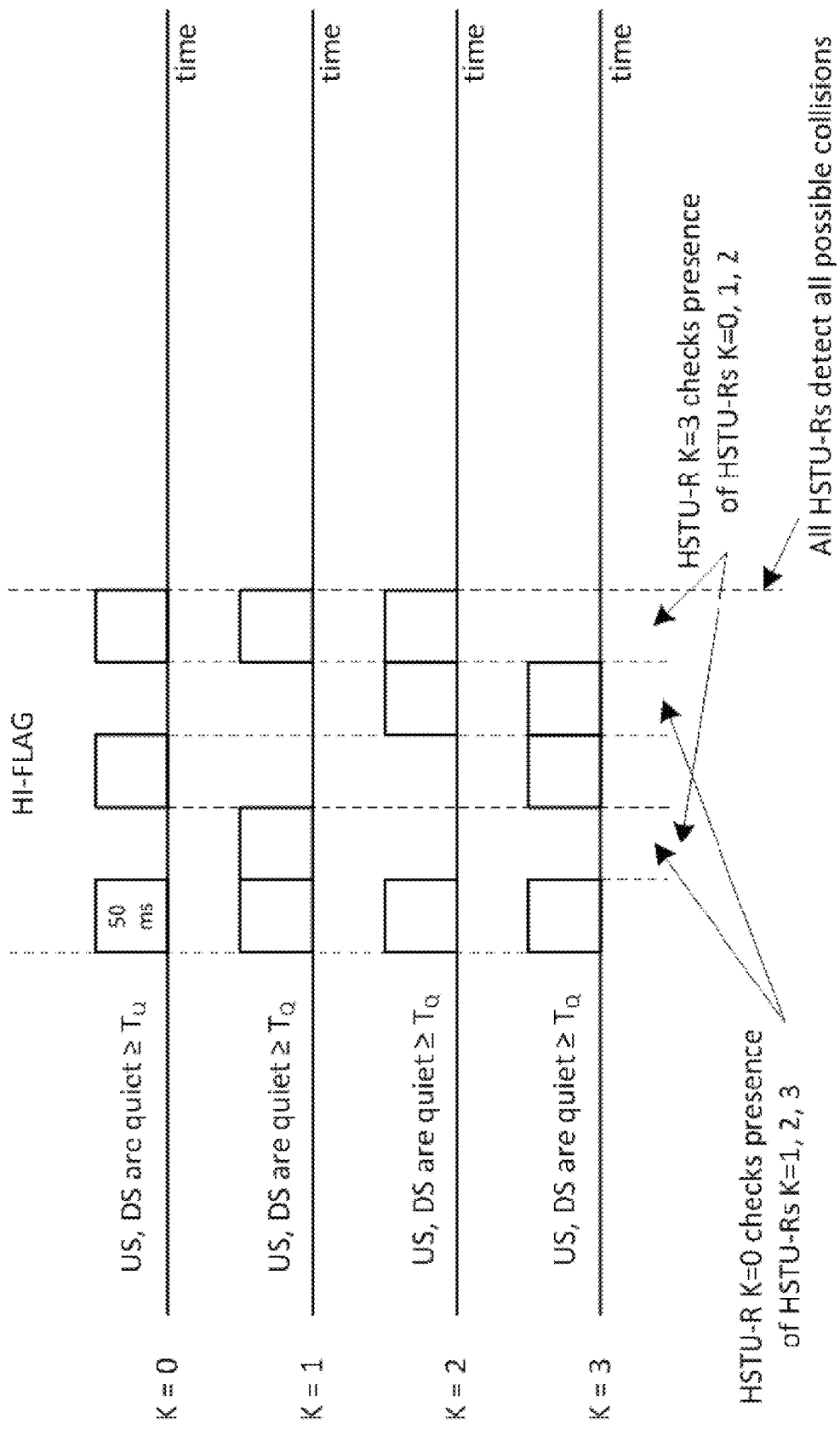
FIG. 7 is a diagram illustrating example no-priority HI-FLAG patterns for a scenario involving a maximum of four CPEs, according to various embodiments discussed herein.

Referring to FIG. 7, illustrated is a diagram showing example no-priority HI-FLAG patterns for a scenario involving a maximum of four CPEs, according to various embodiments discussed herein. Each HSTU-R monitors presence of other HI-FLAGs during its silent slots; at the end of the HI-FLAG each HSTU-R detects the presence of other HSTU-Rs on the line. If any are detected, all HSTU-Rs back off and re-start after Tai seconds. If none are detected, the HSTU-R can proceed with a standard G.994.1 procedure.

Frequency Domain Patterns:

The priority-based pattern and no priority pattern described above are examples of time domain patterns. The tones used in HI-FLAGs for time domain patterns (e.g., the priority-based pattern and no priority pattern, etc.) can be either from a US (upstream) set or from a DS (downstream) set, or from a special set that does not belong to either US or DS tone sets.

In other embodiments, frequency domain patterns can be used. With a frequency domain pattern, each particular can HSTU-R transmit its HI-FLAG using a unique tone set (e.g., uniquely associated with that K value, etc.), so the HSTU-R receiver can identify transmission of other HSTU-Rs during transmission of their HI-FLAGs and, if detected, stay silent for time Tai and then restart. Frequency domain patterns can be employed with and without priority, and Tai can be selected in a variety of manners (not depending on K, or depending on K, or random, or other).

Technique 2—P2MP Initialization Control Using Invitation Flag (INV-FLAG)

In the second technique, HSTU-Rs can be configured for P2MP, as described above (for N HSTU-Rs total, for example, 4 HSTU-Rs, as above), with the following conditions: (1) One of the N HSTU-Rs (e.g., of the RGW/head-CPE, which can be assigned K=0) can be configured as a first starting HSTU-R in all situations, and (2) The additional HSTU-Rs (e.g., those assigned K=1, 2, 3, etc.) can stay silent and start-up only when invited by receiving an Invitation Flag (INV-FLAG), which is unique for each additional HSTU-R. The invitation flag could be also used in the case when HSTU-Rs can't detect signals from each other, as discussed above. In this case, the assignment of first starting HSTU-R can be unnecessary.

Two procedures can be employed for the second technique: (1) HSTU-C controlled procedure or (2) HSTU-R controlled procedure.

HSTU-C Controlled Procedure:

With a HSTU-C controlled procedure, the HSTU-Rs can perform the following three actions before starting the standard G.994.1 procedure.

In a first action, the HSTU-R configured as the first starting HSTU-R (e.g., of a RGW/head-CPE, which can be assigned K=0) can use the standard G.994.1 HSTU-R-initiated start-up procedure, and can start the procedure at an arbitrary time. As a part of the G.994.1 procedure, during the message exchange, the first starting HSTU-R can indicate its P2MP capabilities to the HSTU-C via an associated code point (e.g., as discussed in connection with the ITU-T G.994.1 message exchange protocol) or by using a special HS tone simultaneously with a standard P2P tone set. If the P2MP operation mode is accepted, the HSTU-C can start the P2MP procedure. If not, the CPE associated with HSTU-R K=0 (e.g., RGW/head-CPE) can remain the single CPE connected to the CO/DPU and can continue regular P2P data transmission (using, in the latter case, the standard P2P HS tone set).

In a second action (which can be performed when the P2MP operation mode is accepted), the HSTU-C can start the P2MP procedure by sending a first INV-FLAG (followed after an appropriate time by other INV-FLAG(s) as applicable, sequentially), which carries a pattern associated with a particular additional HSTU-R (e.g., with K=1). The additional HSTU-Rs can stay silent and each can wait for its INV-FLAG. As each additional HSTU-R detects its INV-FLAG, it can start the standard G.994.1 start-up procedure. Additional HSTU-Rs can constantly monitor the medium for their INV-FLAG and can wait until invited (i.e., via detection of their INV-FLAG on the line) before starting the standard G.994.1 start-up procedure (e.g., which can be started by an additional HSTU-R in response to detection of its associated INV-FLAG).

In a third action, the HSTU-C, when not participating in an active G.994.1 procedure, can send INV-FLAGs (e.g., all INV-FLAGs, those not associated with currently joined HSTU-Rs, those associated with HSTU-Rs indicated (e.g., via a first joining HSTU-R) as participating in the network, those associated with unjoined HSTU-Rs indicated (e.g., via a first joining HSTU-R) as participating in the network, etc.) periodically, one after another, to facilitate joining of HSTU-Rs that are not yet initialized. These INV-FLAGs can be separated from each other (e.g., by certain time periods of silence), so that each INV-FLAG can be recognized. The number of additional HSTU-Rs participating in the network can be indicated to the HSTU-C by the HSTU-R K=0 as a part of P2MP setup. After all HSTU-Rs are initialized, the HSTU-C may stop sending INV-FLAGs (alternatively, each can be stopped once the associated HSTU-R is initialized) and can optionally disable the HSTU-C, until or unless one of the CPEs fails for some reason.

The function of HSTU-R K=0 can be always present; if a particular CPE associated with HSTU-R K=0 is eventually turned off, the K=0 functionality can be moved to HSTU-R of another CPE. In various embodiments, this can be done by the CO/DPU management system via appropriate command or by the user (manually). In some embodiments, HSTU-Rs may also establish a handover procedure for K=0 functionality, if associated communication between CPEs is possible.

In another embodiment, an INV-FLAG can reflect specific and unique characteristics of the HSTU-R requesting the connection, such as its number K or similar. If due to collision or noise a wrong HSTU-R attempts to join, reception of inappropriate INV-FLAG is a sign for this HSTU-R to drop off and restart. This situation may happen, for instance, if connected CPEs can't detect presence of each other, as discussed above.

Operation of INV-FLAG:

In one embodiment, each INV-FLAG can comprise a number of consecutive time slots (e.g., of 50 ms each). The first and the last time slots can be always active, and the middle slots can carry a pattern of active and quiet. In one example embodiment, each INV-FLAG can comprise 5 slots (with a total duration of the INV-FLAG, similar to the HI-FLAGs discussed above, of 250 ms), from which the first and the fifth are always active, but slots 2, 3, and 4, respectively, can use the following patterns: (1) INV-FLAG for HSTU-R with K=1: inactive, inactive, active; (2) INV-FLAG for HSTU-R with K=2: inactive, active, active; and (3) INV-FLAG for HSTU-R with K=3: active, inactive, inactive. Other patterns are also possible, and in various embodiments, after INV-FLAG, a certain silent period can be assigned for simplification of INV-FLAG detection; the duration of this period can be substantially longer than the 3 middle slots of the INV-FLAG (which can help to avoid misreading single sequential INV-FLAGs).

After an INV-FLAG with an appropriate pattern is received, the corresponding HSTU-R can either start the standard HSTU-R initiated G.994.1 start-up procedure, or stay silent (e.g., if no data service is required for the corresponding CPE).

Alternatively, the HSTU-C can attempt a standard G.994.1 HSTU-C-initiated startup to initialize the invited HSTU-R. However, the additional HSTU-Rs that did not receive an appropriate INV-FLAG within a predefined time before the HSTU-C initiated startup remains silent in response to the HSTU-C-initiated startup.

HSTU-R Controlled Procedure:

With the HSTU-R controlled procedure, the additional steps before starting the standard G.994.1 procedure can be the same as in the HSTU-C controlled procedure described above. However, in embodiments employing the HSTU-R controlled procedure, the P2MP procedure can be started not by HSTU-C, but by the HSTU-R configured K=0. In such embodiments, the HSTU-C instead can be aware that multiple HSTU-Rs are connected, the number of HSTU-Rs connected, and other relevant parameters. The HSTU-R controlled procedure can involve the following actions.

In a first action, the first connecting HSTU-R (e.g., the one configured with K=0) can use the standard G.994.1 HSTU-R-initiated start-up procedure, and can start the procedure at an arbitrary time. As a part of the G.994.1 procedure, during the message exchange, the HSTU-R can indicate P2MP capabilities to the HSTU-C via an associated code point (e.g., as discussed in the ITU-T G.994.1 message exchange protocol). If P2MP operation is accepted by the HSTU-C, the HSTU-R K=0 can start the P2MP procedure. If P2MP operation mode is not accepted by the HSTU-C, the CPE associated with HSTU-R K=0 remains the single CPE connected to the CO/DPU and can continue the regular P2P data transmission.

In a second action, the first connecting HSTU-R (e.g., K=0), after completing its own startup, can start the P2MP procedure by sending an INV-FLAG to one of the additional HSTU-Rs (e.g., with K=1) (followed after an appropriate time by other INV-FLAG(s) as applicable, sequentially). As each additional HSTU-R detects its INV-FLAG, it can start the standard G.994.1 start-up procedure. Additional HSTU-Rs wait to start until invited (i.e., until they detect their associated INV-FLAG on the line), and constantly monitor the medium for their INV-FLAG until detected.

In a third action, the first connecting HSTU-R (e.g., K=0), when not participating in active G.994.1 procedure, can send INV-FLAGs (e.g., all INV-FLAGs, those not associated with currently joined HSTU-Rs, those associated with HSTU-Rs indicated (e.g., via a first joining HSTU-R) as participating in the network, those associated with unjoined HSTU-Rs indicated (e.g., via a first joining HSTU-R) as participating in the network, etc.) periodically, one after another, to facilitate joining of HSTU-Rs that are not yet initialized. The INV-FLAGs can be separated from each other (e.g., by certain time periods of silence), so that each INV-FLAG can be recognized. The management system of the CO/DPU modem can inform HSTU-R K=0 when all CPEs connected to the CO are initialized (or, alternatively when each CPE connected to the CO is initialized), so the first connecting HSTU-R (e.g., K=0) can stop transmitting all of the INV-FLAGs (or, alternatively, individual INV-FLAGs). In scenarios wherein the first connecting HSTU-R (e.g., K=0) has no communication with the CO/DPU modem, that HSTU-R can send INV-FLAGs periodically, to let additional HSTU-Rs initialize if associated CPEs eventually fail.

Additionally, a handover procedure for K=0 functionality can be employed in various embodiments, similar to that discussed above in connection with the HSTU-C controlled procedure.

With separation in time (e.g., according to any variation of the first technique or the second technique), the standard G.994.1 protocol can serve for P2MP. All HSTU-Rs can be activated by a single standard HSTU-C one after another, as the handshake channel is freed, thus using the same upstream and downstream tone sets. Additionally, some techniques can allow all HSTU-Rs to have the same exact functionality.

However, with separation in time, CPEs run G.994.1 handshake sequentially, which increases total P2MP initialization time.

Use of G.994.1 by Separating HSTU-Rs Transmission Levels

In some scenarios, when all HSTU-Rs participating in P2MP have similar line attenuation towards HSTU-C and this attenuation is also relatively low, they can be separated by different transmission powers. The noise immunity of handshake procedure is usually very high, such that it can work with signal-to-noise ratio of less than 6 dB. If the difference in transmission levels is higher, the transmission of HSTU-R with lower level will not disturb the HSTU-C receiving a signal from a HSTU-R with a higher power level, but can be considered the same as crosstalk from other line. After the G.994.1 protocol progresses to the point at which HSTU-R can establish and use its ID during communication (as discussed in G.994.1), the HSTU-R with the lower level can automatically drop off. As it restarts again, the HSTU-R with higher transmit power likely has completed the handshake procedure and can release the medium.

An example of transmit power reductions that can be employed for four CPEs is shown in Table 2:

TABLE 2

Power levels for P2MP HSTU-Rs

| CPE # | US power level | DS power level |
|---|---|---|
| CPE K = 0 | Nominal | Nominal |
| CPE K = 1 | Nominal − 8 dB | Nominal |
| CPE K = 2 | Nominal − 16 dB | Nominal |
| CPE K = 3 | Nominal − 24 dB | Nominal |

Similar to separation in time, for separation in power, all HSTU-Rs can monitor the medium prior to starting transmission, and can start only after the medium is free for a certain period of time. In the event a HSTU-R is dropped off, it can restart after waiting a certain time, which can be random or depends on the value of K.

In some embodiments, after one or more consecutive drop offs, the HSTU-R can temporarily jump to a higher power level (to get priority in starting up).

Figure 8:
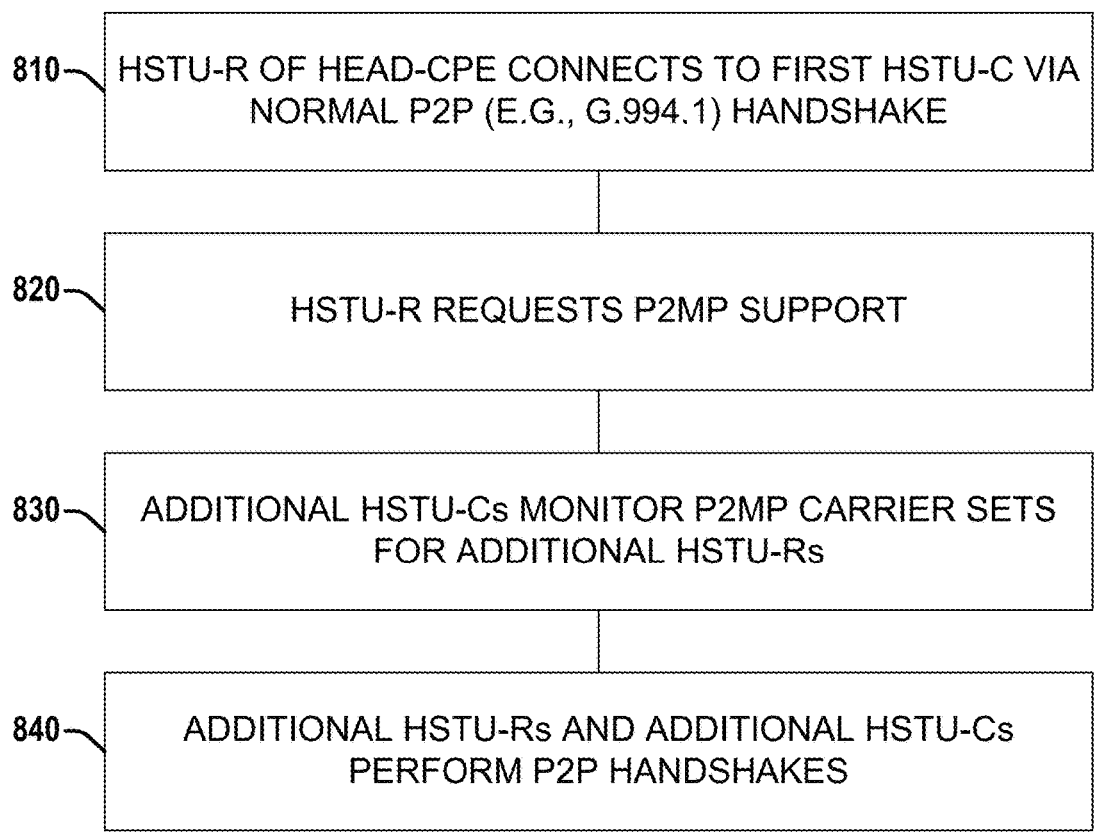
FIG. 8 is a flow diagram illustrating an example method employable at a CPE that facilitates P2MP operation via coordinating handshake operations via signaling that is separated in frequency, according to various aspects discussed herein.

Referring to FIG. 8, illustrated is a flow diagram of an example method 800 employable at a CPE that facilitates P2MP operation via coordinating handshake operations via signaling that is separated in frequency, according to various aspects discussed herein. In other aspects, a machine readable medium can store instructions associated with method 800 that, when executed, can cause a CPE to perform the acts of method 800.

At 810, the HSTU-R of a RGW or head-CPE can connect to a first HSTU-C of a CO/DPU via a normal P2P (e.g., G.994.1) handshake procedure.

At 820, the RGW or head-CPE can request P2MP support from the CO/DPU. If no P2MP support is available, the RGW can remain connected via P2P as a sole connected CPE.

At 830, if P2MP is supported, additional HSTU-Cs at the CO/DPU can monitor specific carrier sets for P2MP for signaling from additional HSTU-Rs requesting P2MP handshakes.

At 840, each of one or more additional HSTU-Rs can perform P2MP handshake procedures with associated HSTU-Cs over designated carrier sets associated with those HSTU-Rs and HSTU-Cs.

Additionally or alternatively, method 700 can include one or more other acts described herein in connection with various embodiments of system 100 associated with CPE discussed herein.

Figure 9:
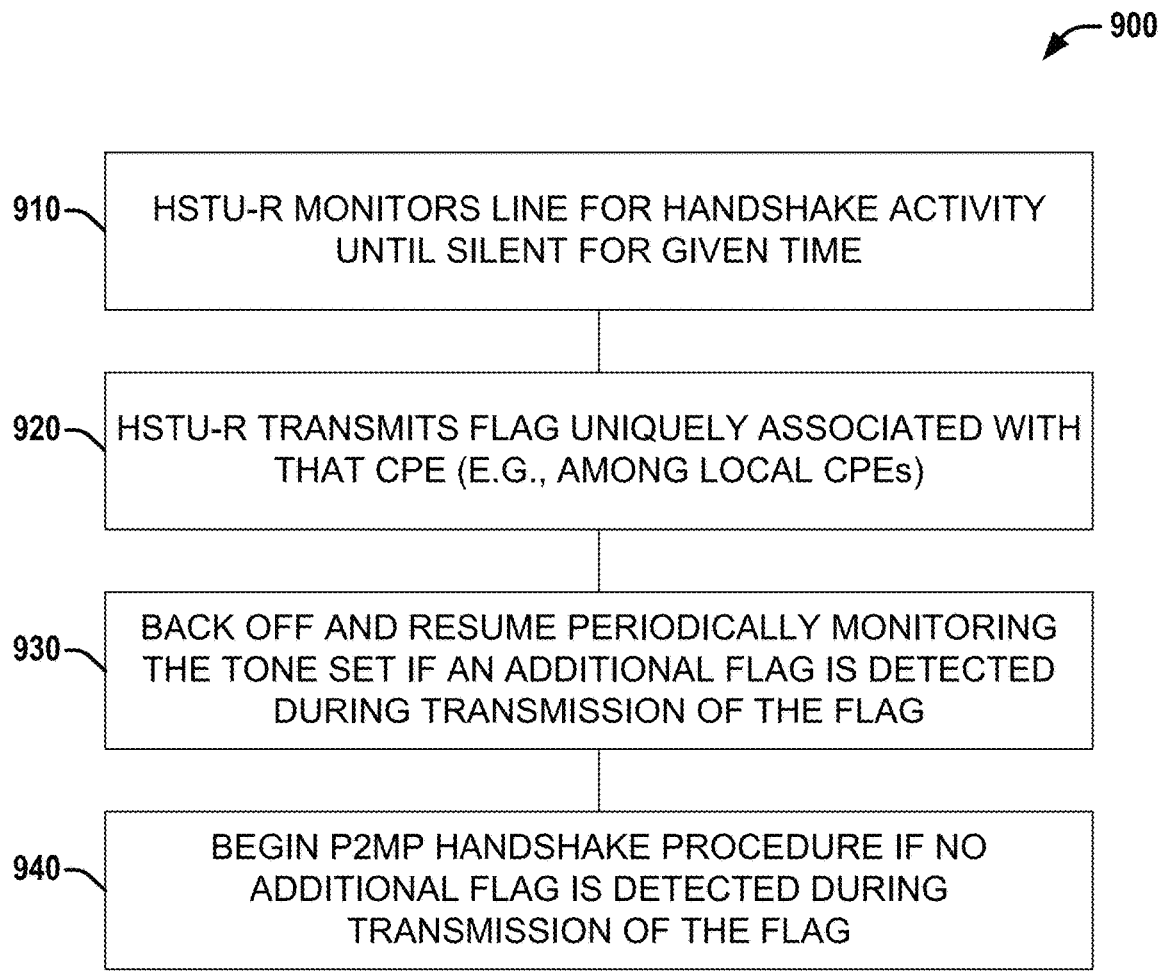
FIG. 9 is a flow diagram illustrating a first example method employable at a CPE that facilitates P2MP operation via coordinating handshake operations via signaling that is separated in time, according to various aspects discussed herein.

Referring to FIG. 9, illustrated is a flow diagram of a first example method 800 employable at a CPE that facilitates P2MP operation via coordinating handshake operations via signaling that is separated in time, according to various aspects discussed herein. In other aspects, a machine readable medium can store instructions associated with method 900 that, when executed, can cause a CPE to perform the acts of method 900.

At 910, an HSTU-R at the CPE can monitor a line (e.g., over a dedicated handshake carrier sets) until the line is silent for at least a first period of time (e.g., which can be a fixed time interval based on the length of flags discussed herein). If the line is not free, in some embodiments the HSTU-R continues monitoring until the line is free for the first period of time, while in other embodiments the HSTU-R backs off and checks the line again after a second period of time (e.g., random, fixed (e.g., based on an ID of the HSTU-R, etc.), etc.) to resume monitoring.

At 920, in response to determining that the line is free for the first period of time, the HSTU-R can transmit a flag uniquely associated with the CPE (e.g., randomly assigned, user-selected, operator-selected, etc.). This flag can be transmitted on generic HS tone set(s), on specially assigned P2MP HS tone set(s), or on both HS tone sets.

At 930, if another flag is detected during the transmission of the flag uniquely associated with the CPE, the HSTU-R backs off (e.g., for the second period of time), after which the procedure can be re-initiated at 910.

At 940, if no other flag is detected during the transmission of the flag uniquely associated with the CPE, the HSTU-R can begin a handshake procedure with a HSTU-C at a CO/DPU.

Additionally or alternatively, method 900 can include one or more other acts described herein in connection with various embodiments of system 100 associated with CPE discussed herein.

Figure 10:
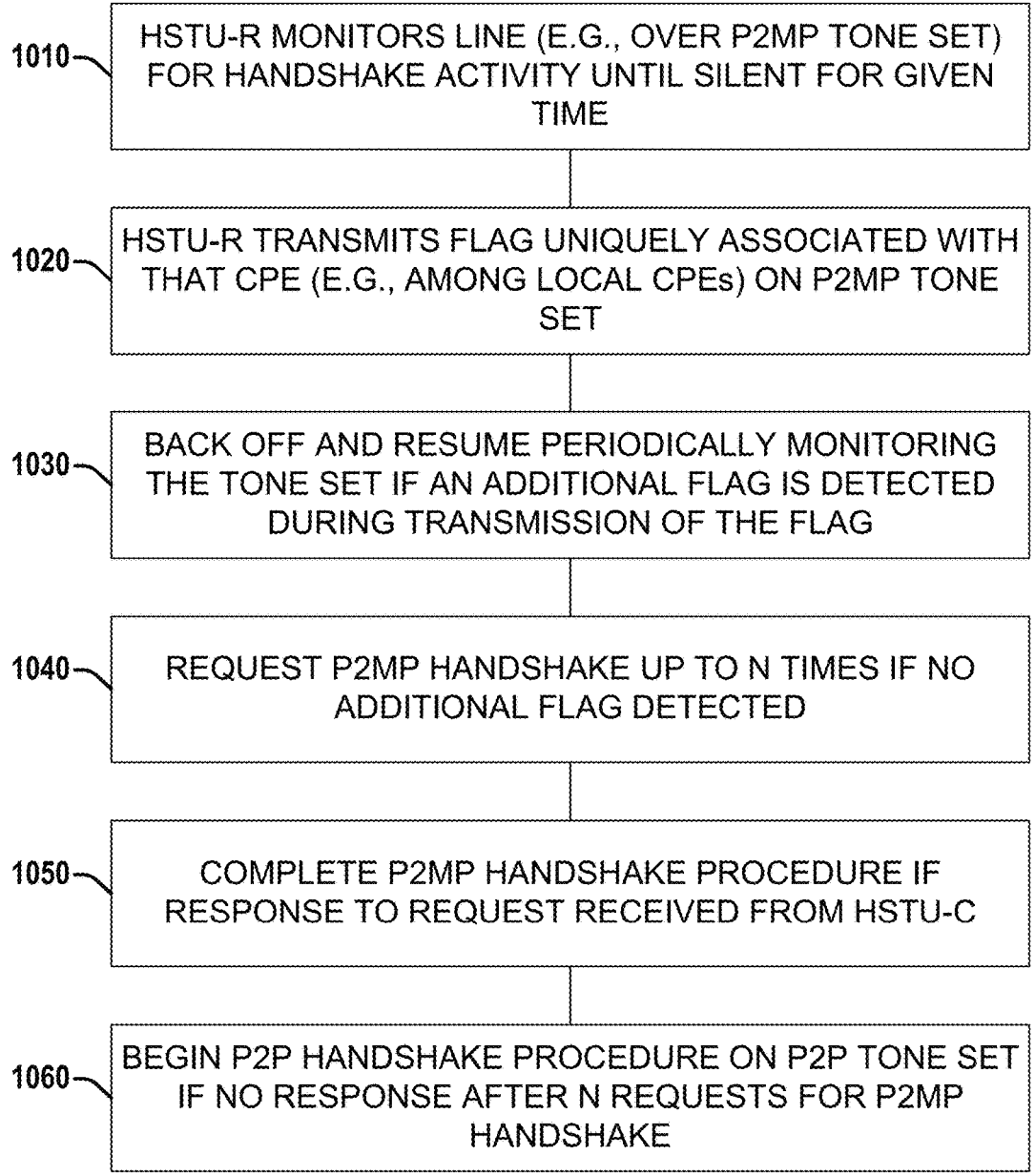
FIG. 10 is a flow diagram illustrating a first example method employable at a CPE that facilitates a handshake with a HSTU-C via one of P2MP tone sets or P2P tone sets, according to various embodiments discussed herein, according to various aspects discussed herein.

Referring to FIG. 10, illustrated is a flow diagram of an example method 1000 employable at a CPE that facilitates a handshake with a HSTU-C via one of P2MP tone sets or P2P tone sets, according to various embodiments discussed herein. In other aspects, a machine readable medium can store instructions associated with method 1000 that, when executed, can cause a CPE to perform the acts of method 1000.

At 1010, an HSTU-R at the CPE can monitor a line (e.g., over dedicated P2MP handshake tone sets) until the line is silent for at least a first period of time (e.g., which can be a fixed time interval based on the length of flags discussed herein). If the line is not free, in some embodiments the HSTU-R continues monitoring until the line is free for the first period of time, while in other embodiments the HSTU-R backs off and checks the line again after a second period of time (e.g., random, fixed (e.g., based on an ID of the HSTU-R, etc.), etc.) to resume monitoring.

At 1020, in response to determining that the line is free for the first period of time, the HSTU-R can transmit a flag uniquely associated with the CPE (e.g., randomly assigned, user-selected, operator-selected, etc.) on the dedicated P2MP HS tone set(s).

At 1030, if another flag is detected (e.g., on the dedicated P2MP HS tone set(s)) during the transmission of the flag uniquely associated with the CPE, the HSTU-R can back off (e.g., for the second period of time), after which the procedure can be re-initiated at 1010.

At 1040, if no other flag is detected during the transmission of the flag uniquely associated with the CPE, the HSTU-R can transmit (e.g., over the dedicated P2MP HS tone set(s)) a request for a P2MP handshake procedure from a HSTU-C at a CO/DPU (e.g., up to N (e.g., 2, etc.) times, wherein each new request can be sent if no response is received within a predetermined time period).

At 1050, if a response to the P2MP handshake request is received from the HSTU-C, the HSTU-R can complete the P2MP handshake procedure with the HSTU-C (e.g., over the dedicated P2MP HS tone set(s)).

At 1060, if no response to the P2MP handshake request is received after N transmissions of the request, the HSTU-R can begin a P2P handshake procedure on a dedicated P2P HS tone set.

Figure 11:
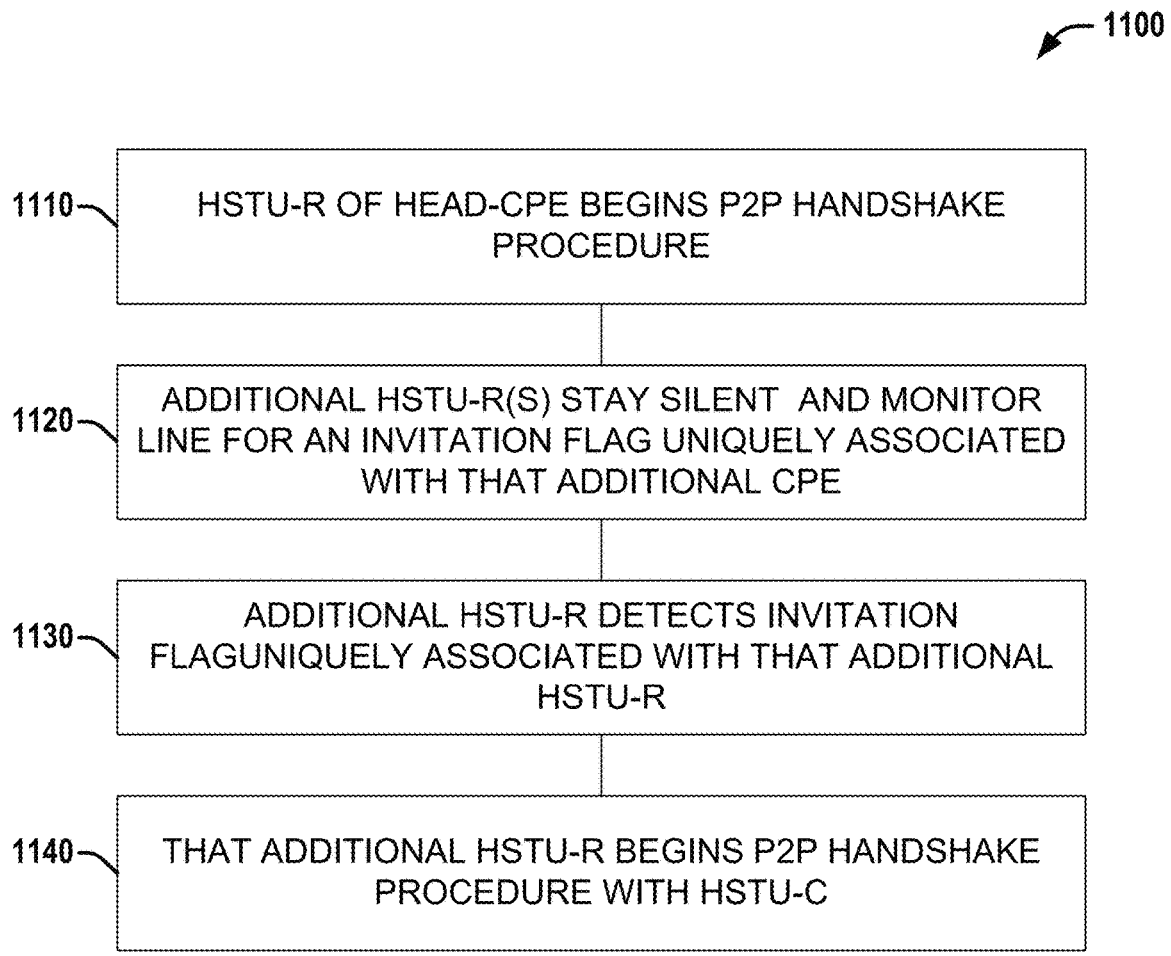
FIG. 11 is a flow diagram illustrating a second example method employable at a CPE that facilitates P2MP operation via coordinating handshake operations via signaling that is separated in time, according to various aspects discussed herein.

Referring to FIG. 11, illustrated is a flow diagram of a second example method 900 employable at a CPE that facilitates P2MP operation via coordinating handshake operations via signaling that is separated in time, according to various aspects discussed herein. In other aspects, a machine readable medium can store instructions associated with method 1100 that, when executed, can cause a CPE to perform the acts of method 1100.

At 1110, a HSTU-R of a head-CPE can begin a handshake procedure with a HSTU-C. During the handshake procedure, the HSTU-R of the head-CPE can request P2MP operation. If not supported, the method can end with the head-CPE as a sole connected CPE.

At 1120, if P2MP operation is supported, each of one or more additional HSTU-Rs can stay silent and monitor the line for an invitation flag uniquely associated with the CPE comprising that additional HSTU-R.

At 1130, an additional HSTU-R can detect an invitation flag uniquely associated with its CPE.

At 1140, that additional HSTU-R can begin a handshake procedure with a HSTU-C.

1130 and 1140 can be repeated until each additional CPE is connected.

Additionally or alternatively, method 1100 can include one or more other acts described herein in connection with various embodiments of system 100 associated with CPE discussed herein.

Figure 12:
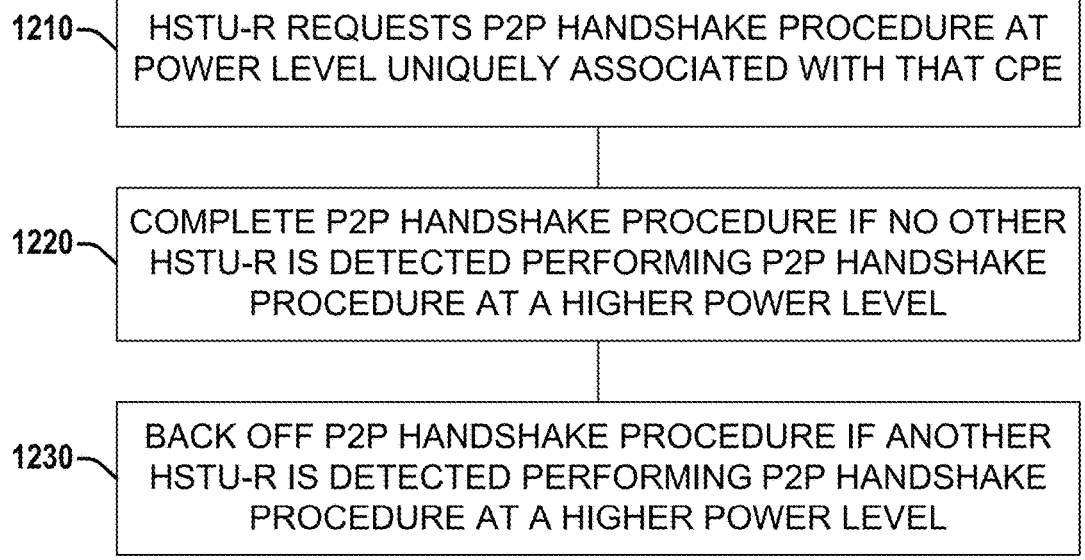
FIG. 12 is a flow diagram illustrating an example method employable at a CPE that facilitates P2MP operation via coordinating handshake operations via signaling that is separated in transmission power, according to various aspects discussed herein.

Referring to FIG. 12, illustrated is a flow diagram of an example method 1200 employable at a CPE that facilitates P2MP operation via coordinating handshake operations via signaling that is separated in transmission power, according to various aspects discussed herein. In other aspects, a machine readable medium can store instructions associated with method 1200 that, when executed, can cause a CPE to perform the acts of method 1200.

At 1210, an HSTU-R can request a handshake procedure at a power level uniquely associated with that HSTU-R among local CPEs.

At 1220, if no other HSTU-R is detected performing a handshake operation at a power level higher than the power level associated with that HSTU-R, the HSTU-R can complete the handshake procedure.

At 1230, if another HSTU-R is detected performing a handshake operation at a power level higher than the power level associated with that HSTU-R, that HSTU-R can back off (e.g., for a random time, for a fixed time (e.g., a time uniquely associated with that HSTU-R among local CPEs), etc.).

Additionally or alternatively, method 1200 can include one or more other acts described herein in connection with various embodiments of system 100 associated with CPE discussed herein.

Examples herein can include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described.

In a first example embodiment, a method can be performed that can provide a handshake between a DPU/CO modem, which can be a multi-mode device, and multiple multi-mode devices at the customer premises connected point-to-multipoint (P2MP), without pre-configuration.

In a second example embodiment, a method can be performed that can employ a dedicated legacy P2P handshake procedure (e.g., the standard ITU-T G.994.1 handshake procedure) to facilitate P2MP operation by prepending certain flags to the standard G.994.1 procedure, for example, transmitting certain flags before transmitting signals associated with the G.994.1 procedure to conclude whether a CPE is eligible to start G.994.1 handshake at particular time or not.

In a third example embodiment, a method can be performed that can facilitate any CPE node to communicate with DPU/CO node using standard G.994.1 protocol via one of the following arrangements: (1) multiple CPEs run G.994.1 with DPU/CO units in parallel (all CPEs at the same time, without disrupting each other's G.994.1) or (2) multiple CPEs run G.994.1 sequentially, one after another.

In a fourth example embodiment, a method can be performed that can separate handshakes of P2MP CPEs in frequency, wherein the handshake procedures are initiated by different CPEs independently, each on its own frequency, and can all operate in parallel.

In a fifth example embodiment, a method can be performed that can separate handshakes of P2MP CPEs in time, wherein each CPE doesn't start any procedure if it detects another G.994.1 activity on the line (e.g., all CPEs can start sequentially, one by one); wherein, to prevent simultaneous start, each CPE can first send a special flag, such that if the flag goes through, the CPE starts G.994.1 procedure, and if not, it drops off and restarts after a controlled (e.g., random, predetermined, etc.) time; and wherein one of the following procedures can be employed: (1) a self-controlled procedure with no priority; (2) a priority-based self-controlled procedure; (3) a centrally-controlled procedure from the DPU/CO modem; (4) a centrally-controlled procedure from one of the CPEs (a head-CPE); or some other procedure.

In a first variation on the fifth example embodiment, a self-controlled procedure can be employed, wherein the self-controlled procedure (1) can be initiated by different CPEs independently; (2) can depend on the unique pattern used by CPE in Handshake Invitation flag (HI-FLAG), wherein (a) certain CPEs can get priority to start G.994.1 procedure, while all other CPEs drop off (as discussed above in connection with priority-based patterns), or (b) all CPEs that start sending the HI-FLAG at the same time drop off and then restart (as discussed above in connection with no priority patterns).

In a second variation of the fifth example embodiment, a centrally-controlled procedure can be employed, wherein the centrally controlled procedure can be initiated by a dedicated CPE only (e.g., which can be pre-configured); wherein (1) the dedicated CPE can first initiates its connection with the DPU/CO, can activate P2MP procedure in the DPU/CO, and the DPU/CO can invite other CPEs one by one using Invitation flags (INV-FLAG); or (2) the dedicated CPE firsts initiates its connection with the DPU/CO, activates P2MP procedure in the DPU/CO, and then the dedicated CPE invites other CPEs one by one using Invitation flag (INV-FLAG). In some variations of the centrally-controlled procedure, the role of head-CPE can be handed over from one CPE to another: either (1) under control of the DPU/CO modem; or (2) via a self-controlled handover procedure. In other embodiments, the INV-FLAG indicates some unique characteristics of the HSTU-R to be joining, so an HSTU-R that joins as a result of collision, noise, or protocol error can drop off after comparing the characteristics communicated in the INV-FLAG with its own ones.

In a sixth example embodiment, a method can be performed that can separate handshakes of P2MP CPEs by different transmit power, wherein the procedures can be initiated by different CPEs independently, each using its own distinct upstream transmit power; wherein each CPE can hold off on starting its G.994.1 procedure if it detects another G.994.1 activity on the line; wherein if two or more CPEs start simultaneously, the difference in upstream power is sufficient for the CPE with higher power to win, while those with lower power can drop off and restart after a controlled (e.g., random, predetermined, etc.) time; and wherein, in some variations of the sixth example embodiment, a CPE that experiences a certain number of consecutive drop offs can be allowed to temporarily use increased power.

The following are additional example embodiments.

Example 1 is an apparatus configured to be employed in a CPE (Customer Premises Equipment), comprising: a memory; and processing circuitry configured to: attempt detection of an active handshake session on a line for at least a first period of time; in response to not detecting an active handshake session on the line during the first period of time, generate a flag associated with the CPE for a Point-to-MultiPoint (P2MP) handshake for transmission to a Hand Shaking Transceiver Unit (Central Office) (HSTU-C); determine whether any other flags associated with any other CPEs for P2MP handshake are transmitted on the line at the same time as the flag associated with the CPE; and in response to a determination that there are not any other flags associated with any other CPEs for P2MP handshake transmitted on the line at the same time as the flag associated with the CPE, begin a handshake procedure with the HSTU-C.

Example 2 comprises the subject matter of any variation of any of example(s) 1, wherein the first period of time is a fixed period of time.

Example 3 comprises the subject matter of any variation of any of example(s) 1, wherein, in response to detecting an active handshake session on the line during the first period of time, the processing circuitry is further configured to back off the line for a second period of time.

Example 4 comprises the subject matter of any variation of any of example(s) 1, wherein, in response to a determination that there is at least one other flag associated with at least one other CPE for P2MP handshake transmitted on the line at the same time as the flag associated with the CPE, the processing circuitry is further configured to back off the line for a second period of time.

Example 5 comprises the subject matter of any variation of any of example(s) 3-4, wherein the second period of time is a fixed period of time.

Example 6 comprises the subject matter of any variation of any of example(s) 3-4, wherein the second period of time is a random period of time.

Example 7 comprises the subject matter of any variation of any of example(s) 1-4, wherein each of the flag associated with the CPE for the P2MP handshake and the other flags is a distinct flag of a set of possible flags for P2MP handshake.

Example 8 comprises the subject matter of any variation of any of example(s) 7, wherein each flag of the set of possible flags for P2MP handshake comprises an associated first number of consecutive active slots adjacent to an associated second number of consecutive silent slots, wherein for each flag of the set of possible flags, the associated first number of that flag is different from the associated first number of each other flag of the set of possible flags, and wherein for each flag of the set of possible flags, the sum of the associated first number and the associated second number is the same.

Example 9 comprises the subject matter of any variation of any of example(s) 8, wherein, for each flag of the set of possible flags for P2MP handshake, that flag is configured to be detectable by any CPE associated with a flag of the set of possible flags for P2MP handshake having a greater associated second number than the associated second number of that flag.

Example 10 comprises the subject matter of any variation of any of example(s) 7, wherein the flag associated with the CPE for the P2MP handshake is randomly selected from the set of possible flags for P2MP handshake.

Example 11 comprises the subject matter of any variation of any of example(s) 7, wherein the flag associated with the CPE for the P2MP handshake is selected from the set of possible flags for P2MP handshake based on a user-defined selection.

Example 12 comprises the subject matter of any variation of any of example(s) 7, wherein the flag associated with the CPE for the P2MP handshake is selected from the set of possible flags for P2MP handshake based on an operator-defined selection.

Example 13 comprises the subject matter of any variation of any of example(s) 7, wherein, for each flag of the set of possible flags for P2MP handshake, that flag is configured to be detectable by any CPE associated with a different flag of the set of possible flags for P2MP handshake.

Example 14 comprises the subject matter of any variation of any of example(s) 7, wherein each flag of the set of possible flags for P2MP handshake has an associated tone set, wherein for each flag of the set of possible flags for P2MP handshake, the associated tone set for that flag is different than the associated tone set for each other flag of the set of possible flags for P2MP handshake.

Example 15 comprises the subject matter of any variation of any of example(s) 1-4, wherein the handshake procedure is an International Telecommunication Union (ITU)-Telecommunication Standardization Sector (T) G.994.1 handshake procedure.

Example 16 comprises the subject matter of any variation of any of example(s) 1-4, wherein the flag associated with the CPE and the handshake procedure use the same tone set.

Example 17 comprises the subject matter of any variation of any of example(s) 1-4, wherein the flag associated with the CPE and the handshake procedure use different tone sets.

Example 18 comprises the subject matter of any variation of any of example(s) 1-4, wherein the flag associated with the CPE uses a dedicated P2MP handshake tone set.

Example 19 is an apparatus configured to be employed in a CPE (Customer Premises Equipment), comprising: a memory; and processing circuitry configured to: monitor a line for an invitation flag associated with the CPE; and in response to detecting the invitation flag associated with the CPE, begin a Point-to-MultiPoint (P2MP) handshake procedure with a Hand Shaking Transceiver Unit (Central Office) (HSTU-C).

Example 20 comprises the subject matter of any variation of any of example(s) 19, wherein the invitation flag is transmitted by the HSTU-C.

Example 21 comprises the subject matter of any variation of any of example(s) 19, wherein the invitation flag is transmitted by a Hand Shaking Transceiver Unit (Residence) (HSTU-R).

Example 22 comprises the subject matter of any variation of any of example(s) 19-21, wherein the P2MP handshake procedure is an International Telecommunication Union (ITU)-Telecommunication Standardization Sector (T) G.994.1 handshake procedure.

Example 23 comprises the subject matter of any variation of any of example(s) 19-21, wherein the invitation flag associated with the CPE indicates a unique characteristic associated with at least one of the CPE or a HSTU-R (HSTU (Residence)) of the CPE.

Example 24 is an apparatus configured to be employed in a CPE (Customer Premises Equipment), comprising: a memory; and processing circuitry configured to: generate a request for a Point-to-MultiPoint (P2MP) handshake procedure over an upstream carrier set uniquely associated with an identifier (ID) of the CPE; monitor a downstream carrier set uniquely associated with the ID of the CPE for a response associated with the request; and in response to detecting the response associated with the request, begin a Point-to-MultiPoint (P2MP) handshake procedure with a Hand Shaking Transceiver Unit (Central Office) (HSTU-C).

Example 25 comprises the subject matter of any variation of any of example(s) 24, wherein the ID of the CPE is one of K possible IDs, wherein K is a positive integer greater than 1.

Example 26 comprises the subject matter of any variation of any of example(s) 24-25, wherein the ID of the CPE is one of randomly selected, selected by a user, or selected by an operator.

Example 27 comprises the subject matter of any variation of any of example(s) 24-25, wherein the P2MP handshake procedure is an International Telecommunication Union (ITU)-Telecommunication Standardization Sector (T) G.994.1 handshake procedure.

Example 28 is an apparatus configured to be employed in a CPE (Customer Premises Equipment), comprising: a memory; and processing circuitry configured to: generate a request for a Point-to-MultiPoint (P2MP) handshake procedure for transmission over a communication line at an associated power level uniquely associated with an identifier (ID) of the CPE; monitor the communication line for at least one P2MP handshake procedure with an associated power level greater than the associated power level uniquely associated with the ID of the CPE; and in response to not detecting at least one P2MP handshake procedure with an associated power level greater than the associated power level uniquely associated with the ID of the CPE, complete the P2MP handshake procedure.

Example 29 comprises the subject matter of any variation of any of example(s) 28, wherein, in response to detecting at least one P2MP handshake procedure with an associated power level greater than the associated power level uniquely associated with the ID of the CPE, the processing circuitry is further configured to back off the line for a period of time.

Example 30 comprises the subject matter of any variation of any of example(s) 28-29, wherein the ID of the CPE is one of K possible IDs, wherein K is a positive integer greater than 1.

Example 31 comprises the subject matter of any variation of any of example(s) 28-29, wherein the P2MP handshake procedure is an International Telecommunication Union (ITU)-Telecommunication Standardization Sector (T) G.994.1 handshake procedure.

Example 32 comprises an apparatus comprising means for executing any of the described operations of examples 1-31.

Example 33 comprises a machine readable medium that stores instructions for execution by a processor to perform any of the described operations of examples 1-31.

Example 34 comprises an apparatus comprising: a memory interface; and processing circuitry configured to: perform any of the described operations of examples 1-31.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. An apparatus configured to be employed in a CPE (Customer Premises Equipment), comprising:
 a memory; and
 processing circuitry configured to:
   attempt detection of an active handshake session on a line for at least a first period of time;
   in response to not detecting an active handshake session on the line during the first period of time, generate a flag associated with the CPE for a Point-to-MultiPoint (P2MP) handshake for transmission to a Hand Shaking Transceiver Unit (Central Office) (HSTU-C);
   determine whether any other flags associated with any other CPEs for the P2MP handshake are transmitted on the line at the same time as the flag associated with the CPE; and
   in response to a determination that there are not any other flags associated with any other CPEs for the P2MP handshake transmitted on the line at the same time as the flag associated with the CPE, begin a handshake procedure with the HSTU-C.

2. The apparatus of claim 1, wherein the first period of time is a fixed period of time.

3. The apparatus of claim 1, wherein, in response to detecting an active handshake session on the line during the first period of time, the processing circuitry is further configured to back off the line for a second period of time.

4. The apparatus of claim 1, wherein, in response to a determination that there is at least one other flag associated with at least one other CPE for P2MP handshake transmitted on the line at the same time as the flag associated with the CPE, the processing circuitry is further configured to back off the line for a second period of time.

5. The apparatus of claim 4, wherein the second period of time is a fixed period of time.

6. The apparatus of claim 4, wherein the second period of time is a random period of time.

7. The apparatus of claim 1, wherein each of the flag associated with the CPE for the P2MP handshake and the other flags is a distinct flag of a set of possible flags for P2MP handshake.

8. The apparatus of claim 7, wherein the each flag of the set of possible flags for P2MP handshake comprises an associated first number of consecutive active slots adjacent to an associated second number of consecutive silent slots, wherein for each flag of the set of possible flags, the associated first number of that flag is different from the associated first number of each other flag of the set of possible flags, and wherein for each flag of the set of possible flags, the sum of the associated first number and the associated second number is the same.

9. The apparatus of claim 8, wherein, for the each flag of the set of possible flags for P2MP handshake, that flag is configured to be detectable by any CPE associated with a flag of the set of possible flags for P2MP handshake having a greater associated second number than the associated second number of that flag.

10. The apparatus of claim 7, wherein the flag associated with the CPE for the P2MP handshake is randomly selected from the set of possible flags for P2MP handshake.

11. The apparatus of claim 7, wherein the flag associated with the CPE for the P2MP handshake is selected from the set of possible flags for P2MP handshake based on a user-defined selection.

12. The apparatus of claim 7, wherein the flag associated with the CPE for the P2MP handshake is selected from the set of possible flags for P2MP handshake based on an operator-defined selection.

13. The apparatus of claim 7, wherein, for the each flag of the set of possible flags for P2MP handshake, that flag is configured to be detectable by any CPE associated with a different flag of the set of possible flags for P2MP handshake.

14. The apparatus of claim 7, wherein the each flag of the set of possible flags for P2MP handshake has an associated tone set, wherein for each flag of the set of possible flags for P2MP handshake, the associated tone set for that flag is different than the associated tone set for each other flag of the set of possible flags for P2MP handshake.

15. The apparatus of claim 1, wherein the handshake procedure is an International Telecommunication Union (ITU)-Telecommunication Standardization Sector (T) G.994.1 handshake procedure.

16. The apparatus of claim 1, wherein the flag associated with the CPE and the handshake procedure use the same tone set.

17. The apparatus of claim 1, wherein the flag associated with the CPE and the handshake procedure use different tone sets.

18. The apparatus of claim 1, wherein the flag associated with the CPE uses a dedicated P2MP handshake tone set.

* * * * *